(12) United States Patent
LaBarbera

(10) Patent No.: US 7,216,861 B1
(45) Date of Patent: May 15, 2007

(54) PROTECTIVE SLEEVE FOR ADJUSTABLE SHOCK ABSORBER

(75) Inventor: George E. LaBarbera, Sugar Grove, PA (US)

(73) Assignee: Big Shot Performance, LLC, Sugar Grove, PA (US)

( * ) Notice: Subject to any disclaimer, the term of this patent is extended or adjusted under 35 U.S.C. 154(b) by 2 days.

(21) Appl. No.: 11/220,427

(22) Filed: Sep. 7, 2005

(51) Int. Cl.
*F16F 9/56* (2006.01)
(52) U.S. Cl. .................... 267/221; 188/322.19
(58) Field of Classification Search .......... 188/ 322.12–322.22; 267/221, 34
See application file for complete search history.

(56) References Cited

U.S. PATENT DOCUMENTS

| 4,167,991 A | * | 9/1979 | Karklins et al. | 188/322.12 |
| 4,281,884 A | * | 8/1981 | Freitag et al. | 439/32 |
| 4,744,444 A | * | 5/1988 | Gillingham | 188/315 |
| 5,350,185 A | * | 9/1994 | Robinson | 280/276 |
| 5,454,550 A | * | 10/1995 | Christopherson | 267/221 |
| 5,477,948 A | * | 12/1995 | Stevens | 267/221 |
| 5,961,106 A | * | 10/1999 | Shaffer | 267/221 |

FOREIGN PATENT DOCUMENTS

FR  2249266  * 10/1973

* cited by examiner

*Primary Examiner*—Christopher P. Schwartz
(74) *Attorney, Agent, or Firm*—Richard K Thomson

(57) ABSTRACT

A cylindrical sleeve is inserted between the body of a competition shock absorber and its adjustable compression spring to protect the body from undue wear created by rubbing of the spring on the threads formed on the external surface of the shock. Different color sleeves can be used on shocks having different performance characteristics to facilitate change out to accommodate varying track conditions.

4 Claims, 2 Drawing Sheets

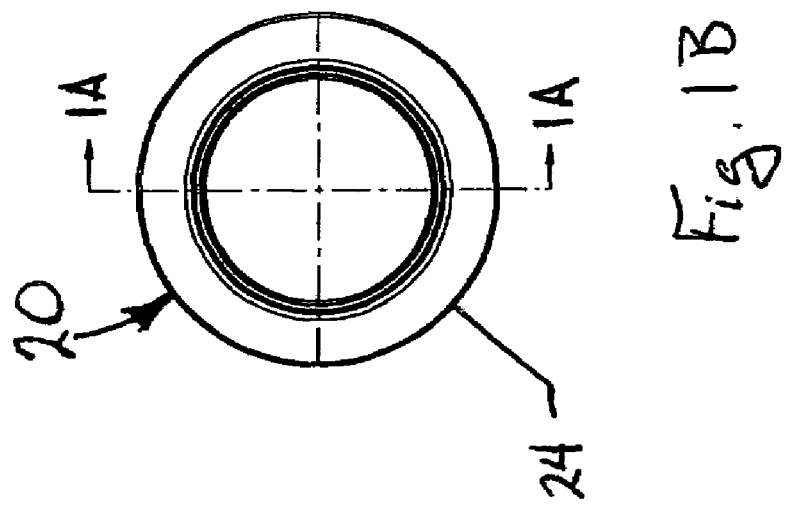
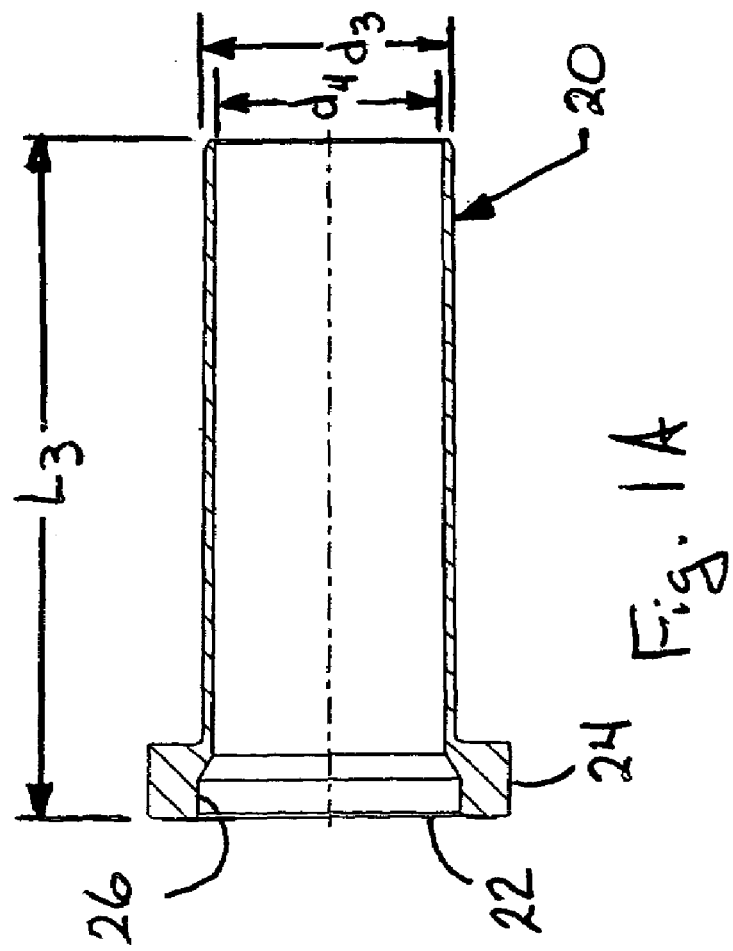
Fig. 1B
Fig. 1A

PROTECTIVE SLEEVE FOR ADJUSTABLE SHOCK ABSORBER

BACKGROUND AND SUMMARY OF THE INVENTION

The present invention is directed to the automotive field. More particularly, the present invention is directed to a protective shield for competition shock absorbers to protect the shock, including its threaded adjustable shaft, from excessive wear from its adjustable-compression coiled spring.

Competition shock absorbers used in the racing environment, are exposed to extreme forces as the cars maneuver through the turns of the typically oval track. The racing shocks have a coil spring whose compression is adjustable by means of a pre-load collar being rotated on a thread extending along the exterior of the shock body. As a race car is put through its paces, these coil springs deflect into contact with the outside of the shock and the normal extension and compression of the shock causes damage to the threads on the shock body, to the point where adjustment of the pre-load collar is no longer possible. This wear damage necessitates replacement of these high-end shocks long before they would otherwise need to be changed out.

It is the object of this invention to provide a wear sleeve positioned between the shock body and the spring to protect the shock body from this type of damage. The invention comprises the improvement of a protective cylindrical sleeve surrounding the inner threaded cylinder inside of the coil spring, said protective sleeve having a cylindrical body portion of a third length $L_3$ substantially equal to $L_1$ and an outer diameter $d_3$ which is less than $d_2$, whereby the outer surface or the inner cylinder is protected from rubbing-induced wear caused by the coil spring.

The protective sleeve has a flange protruding radially from one end which serves as a substitute reaction surface for the coil spring. Preferably, the protective sleeve is made of a durable plastic material selected from the group consisting of nylon, composites and temperature-resistant, high-strength plastics. The sleeves can be made in several colors which will enable pit crews to identify sets of shock absorbers with different performance characteristics, simplifying shock change out to accommodate varying track conditions.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which FIG. 1A is a cross-sectional side view of a first embodiment of the protective sleeve of the present invention as seen along line 1A—1A in FIG. 1B;

FIG. 1B is a top view of the first embodiment;

DETAILED DESCRIPTION OF PREFERRED EMBODIMENT(S)

Figures 2, 3:
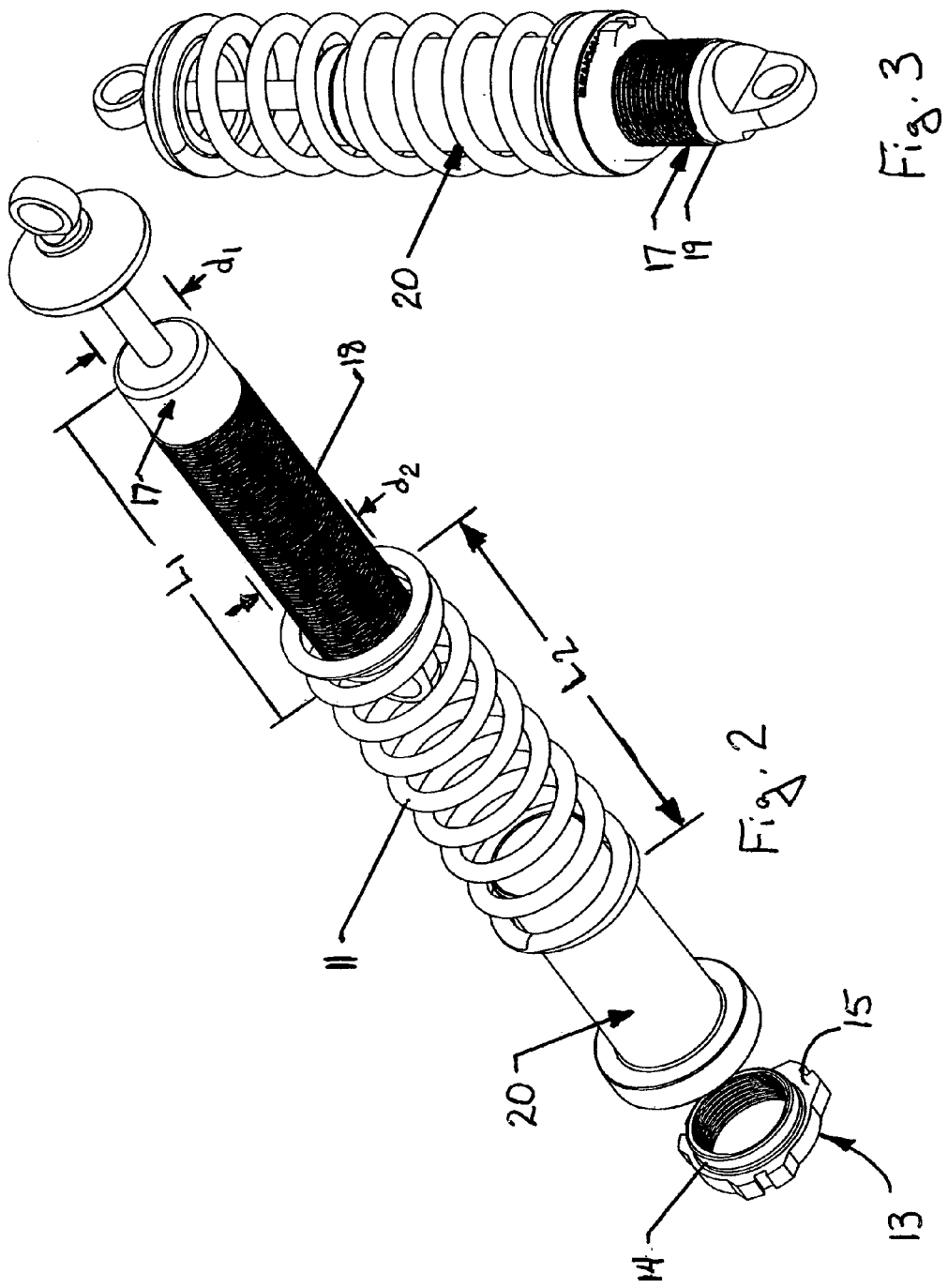
FIG. 2 is a is an exploded perspective view of a competitive shock absorber equipped with the first embodiment; and, FIG. 3 is a perspective side view of a competitive shock absorber equipped with the first embodiment of the protective sleeve of the present invention.

A first embodiment of the protective sleeve of the present invention is shown in FIGS. 1A and 1B generally at 20. Sleeve 20 is generally cylindrical with a protruding flange 24 formed at a first end 22 of sleeve 20. Flange 24 becomes an alternative reaction surface for adjustable-compression spring 11, replacing surface 15 on pre-load collar 13. By having spring 11 react against flange 24, a double purpose is served: sleeve 20 is maintained in its desired position and collar 13 is protected from wear damage by spring 11. Cylindrical shock body 17 has a thread 18 formed along a majority of its length $L_1$, thread 18 having a maximum diameter $d_1$. Compression-adjustable coil spring 11 has a second uncompressed length $L_2$ and an inner diameter $d_2$. Sleeve 20 has a length $L_3$ which is substantially equal to the length $L_1$ to ensure protection of threads 18 for all adjustment positions of pre-load collar 13. The outer diameter $d_3$ is less than the inner diameter $d_2$ of spring 11. Obviously, the inner diameter $d_4$ of sleeve 20 exceeds the maximum diameter $d_1$ of threads 18 to avoid contact therewith. Sleeve 20 is preferably made from a group of materials consisting of nylon, composites, and temperature-resistant high-strength plastics.

As seen in FIG. 2, sleeve 20 is installed over shock body 17 inside of spring 11. The cylindrical flange 14 on pre-load collar 13 fits inside flange 24 of sleeve 20 in recess 26 maintaining its axial alignment with shock body 17 and spring 11. Pre-load collar 13 is then threaded onto end 19 of shock body 17 as shown in FIG. 3 to provide the desired compression of spring 11 prior to installation on the racing car. It is envisioned that sleeves 20 will be made available in a variety of colors so that a set of shocks can be equipped with one color. This will enable a pit crew to more easily identify shocks with particular characteristics when adjusting the performance of the vehicle to accommodate varying track conditions.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. In an adjustable shock absorber having an inner cylinder with a first length $L_1$ and an outer threaded diameter with a maximum diameter $d_1$, the inner threaded cylinder being surrounded by a coil spring having a second length $L_2$ and an inner diameter $d_2$ which is greater than $d_1$ whose compressive force is adjustable, the improvement comprising a protective cylindrical sleeve surrounding the inner cylinder inside of the coil spring, said protective sleeve having a cylindrical body portion of a third length $L_3$ substantially equal to $L_1$ and an outer diameter $d_3$ which is less than $d_2$, inner diameter $d_4$ of said protective sleeve exceeding said maximum diameter $d_1$ of said threads to avoid contact therewith, whereby the outer surface or the inner cylinder is protected from rubbing-induced wear caused by the coil spring.

2. The improvement of claim 1 wherein said protective sleeve further comprises a radially extending flange formed at a first end of said cylindrical body portion, said radially extending flange serving as a reaction surface for one end of the coil spring.

3. The improvement of claim 1 wherein said protective sleeve is made of a durable plastic material.

4. The improvement of claim 3 wherein said durable plastic material is selected from the group consisting of nylon, composites, and temperature-resistant, high-strength plastics.

* * * * *